United States Patent
Ciochina (10) Patent No.: US 11,121,901 B2
(45) Date of Patent: Sep. 14, 2021

(54) SYMBOLS INCORPORATION SCHEME FOR DFT-S-OFDM

(71) Applicant: MITSUBISHI ELECTRIC CORPORATION, Tokyo (JP)

(72) Inventor: Cristina Ciochina, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/056,843

(22) PCT Filed: Jun. 24, 2019

(86) PCT No.: PCT/JP2019/025997
§ 371 (c)(1),
(2) Date: Nov. 19, 2020

(87) PCT Pub. No.: WO2020/021971
PCT Pub. Date: Jan. 30, 2020

(65) Prior Publication Data
US 2021/0211345 A1    Jul. 8, 2021

(30) Foreign Application Priority Data
Jul. 26, 2018 (EP) .................. 18306014

(51) Int. Cl.
*H04L 27/26* (2006.01)

(52) U.S. Cl.
CPC ...... *H04L 27/2636* (2013.01); *H04L 27/2614* (2013.01)

(58) Field of Classification Search
CPC ............... H04L 27/2636; H04L 27/2614
See application file for complete search history.

(56) References Cited

U.S. PATENT DOCUMENTS

| | | | |
|---|---|---|---|
| 2011/0243039 A1* | 10/2011 | Papasakellariou | H04L 5/0042 370/280 |
| 2012/0195292 A1* | 8/2012 | Ko | H04L 5/001 370/336 |

(Continued)

OTHER PUBLICATIONS

International Search Report, issued in PCT/JP2019/025997, dated Sep. 19, 2019.

(Continued)

*Primary Examiner* — David S Huang
(74) *Attorney, Agent, or Firm* — Birch, Stewart, Kolasch & Birch, LLP (57) ABSTRACT

The invention relates to a method for transmitting a group of Q symbols ($A_0; \ldots ; A_{Q-1}$) in a DFTsOFDM radio signal, said radio signal being provided by applying a M size DFT and a N-size IDFT to a block of symbols $X=(X_0, \ldots X_{M-1})$, said method comprising: —determining Q positions $n_i$ in the block of symbols, such as (I); —transmitting the Q symbols through the radio signal, such as for each i, samples of the symbol $a_i$ in the radio signal are equal to a result of the application of a DFTsOFDM scheme to a block of M symbols with values of symbols $X_{ni+mL}$, being $e^{j2\pi k(ni+mL)/M} A_i$ with k integer such as $0 \leq k < K$, with m integer such as $0 \leq m < K$.

12 Claims, 7 Drawing Sheets

(56) References Cited

U.S. PATENT DOCUMENTS

2014/0274087 A1* 9/2014 Frenne ................ H04L 5/0037
455/452.1
2020/0052948 A1* 2/2020 Sahin .................. H04B 1/7085

OTHER PUBLICATIONS

Written Opinion of the International Searching Authority, issued in PCT/JP2019/025997, dated Sep. 19, 2019.

* cited by examiner

SYMBOLS INCORPORATION SCHEME FOR DFT-S-OFDM

TECHNICAL FIELD

The present invention generally relates to the domain of telecommunication system, and more specifically to the incorporation of symbols like reference signals in the context of communications using OFDM transmission schemes.

BACKGROUND ART

It may be necessary to incorporate the symbols in such a manner as they occupy specific combs in the frequency domain. For example, the standards may require reference signals (such as demodulation reference signals—DMRS) to be set on specific subcarriers in the frequency domain.

For this purpose, the symbols (for example the DMRS) are incorporated directly in the frequency domain on the desired subcarriers of the desired comb, the other symbols in the frequency domain are then processed using subcarriers unused by the comb. Therefore, the symbols using the frequency domain comb are incorporated independently from the other symbols, thus, the single carrier property of schemes like the DFTsOFDM scheme is not preserved, leading to high peak to average power ratio (PAPR). To avoid having a high PAPR, in the new standard NR (new radio) only the DMRS are incorporated, leaving the other symbols set to zero, leading to an important loss of spectral efficiency.

Therefore, multiplexing groups of symbols occupying combs in the frequency domain with other symbols may lead to high PAPR and important interferences.

SUMMARY OF INVENTION

The present invention aims at improving the situation.

To that end, the invention relates to a method for transmitting at least a group of Q symbols $(A_0; \ldots; A_{Q-1})$ in a radio signal to be transmitted over a wireless communication system, said radio signal being intended to be emitted by an emitter comprising at least one transmit antenna configured for transmitting on at least a number M, of different frequencies, M being equal to $L \cdot K$ with L and K strictly positive integer and Q being a strictly positive integer strictly smaller than L, said radio signal being provided by:

applying a M size DFT to a block of symbols $X(X_0, \ldots X_{M-1})$, and obtaining for each $k^{th}$ frequency, with k=0 to M−1, a complex symbol $S_k$ in the frequency domain;

obtaining, at an output of an IDFT module corresponding to a transmit antenna a signal representing, in the frequency domain, complex symbols respectively function of $S_k$ for each $k^{th}$ frequency with k=0 to M−1;

emitting the radio signal corresponding to the signal;

said method comprising:

determining Q positions $n_i$ in the block of symbols, such as $\{n_i | i \in [\![0; Q-1]\!], 0 \le n_i < L, \forall i, i' \in [\![0;Q-1]\!]^2, i < i' \Rightarrow n_i < n_{i'}\}$;

transmitting the Q symbols through the radio signal, such as for each i, samples of the symbol $A_i$ in the radio signal are equal to a result outputted by the IDFT module, of the application of the DFT to a block of M symbols with values of symbols $X_{n_i+mL}$, in the positions $n_i+mL$, being respectively $e^{j2\pi k(n_i+mL)/M} A_i$, with k integer such as $0 \le k < K$, with m integer such as $0 \le m < K$, and j the imaginary number.

Such transmission of the Q symbols enables to obtain that the samples of these symbols in the frequency domain are arranged in a comb structure while preserving the single carrier property of the DFTsOFDM scheme. Moreover, the single carrier property is preserved even if other symbols (in positions different from $n_i+mL$ with $(i; m) \in [\![0;Q-1]\!] \times [\![0;K-1]\!]$) are multiplexed in the same DFTsOFDM symbol according to the invention.

The single carrier property of the DFTsOFDM scheme is preserved, since the radio signal transmitting the samples of the Q symbols is the same as a radio signal obtained by applying a DFT and an IDFT on a block of M symbols with values of symbols $X_{n_i+mL}$, in the positions $n_i+mL$, being respectively $e^{j2\pi k(n_i+mL)/M} A_i$. The IDFT size is generally larger than the DFT size. That is, the radio signal transmitting the Q symbols according to the invention is the same as the radio signal obtained by processing, through a DFTsOFDM scheme, the symbols arranged according to the invention in the block of M symbols. Therefore, the single carrier property of the DFTsOFDM scheme is preserved.

According to the invention the samples of the Q symbols in the frequency domain are arranged in a comb structure, that is, the Q symbols only occupy specific frequencies in the frequency domain, which are the frequencies with index k, k+K, k+2K, ..., k+(L−1)K.

In addition, the phase shifted repetition of each symbol $A_i$ of the group of symbols enhances the quality of the transmission of these Q symbols. Indeed, the symbol $A_i$ is repeated K times with a phase shift of $e^{j2\pi k n_i/M}$ between each repetition. Therefore, using K symbols in the block of symbols to transmit each symbol $A_i$ enhances the transmission quality of these symbols. Thus, less transmission error occurs regarding the Q symbols.

This phase shift repetition of symbols can be advantageously used to transmit reference signals. Indeed, if the value of a symbol $A_i$ is known from the receiver and that the receiver knows the position and the phase shift applied, then the receiver has relevant information to deduce the canal quality when receiving the symbol $A_i$ and its phase shifted copies. Thus, the symbol $A_i$ and all its phase shifted copies can be used as reference signals. Therefore, especially when tracking fast phase shift, the symbol $A_i$ and all its phase shifted copies are relevant as reference signals since they are temporally distributed in the DFTsOFDM symbol while being multiplexed with other symbols.

Moreover, it is possible to control the quality of the transmission of the Q symbols by conveniently choosing K and Q. Indeed, the size Q of the group of symbols and the number of phase shifted repetitions K can be chosen regarding the quality of the transmission required for the symbols of that group. For example, since K and Q are directly linked to the effective coding rate of, e.g., the information bits represented by the group of Q symbols, convenient choice of K and Q may be used in the case of transmitting control data with increased quality of transmission. A group of symbol transmitting control data may need a transmission with low error occurrence whereas the consequences of error occurring on the transmission of symbols from a group of symbols that transmit user data may be less crucial for the communication. For example, for a given fixed transmit power per DFTsOFDM symbol, since K and Q are directly linked to the ratio between the power of the group of Q symbols and the power of the remaining symbols, convenient choice of K and Q may be used in the case of transmitting a reference signal represented by the group of Q symbols for meeting target requirements in terms of, e.g., channel estimation quality. For example, choosing Q=M/4 and K=2 leads to using half of the transmit power for conveying the group of Q symbols, which will be present onto half of the subcarriers in the frequency domain (occupying the comb occupying half of the frequency structure: referred as comb ½ frequency structure) (every other subcarrier contains information relative to the group of Q symbols). Thus, the group of Q symbols can be conveniently used for example as DMRS, with an overhead of 50% and a comb ½ frequency structure. For example, choosing Q=M/8 and K=2 leads to using a quarter of the transmit power for conveying the group of Q symbols, which will be present onto half of the subcarriers in the frequency domain (every other subcarrier contains information relative to the group of Q symbols). Thus, the group of Q symbols can be conveniently used for example as DMRS, with an overhead of 25% and a comb ½ frequency structure. For example, choosing Q=M/8 and K=4 leads to using a half of the transmit power for conveying the group of Q symbols, which will be present onto a quarter of the subcarriers in the frequency domain (every 4th subcarrier contains information relative to the group of Q symbols, therefore, occupying the comb occupying a quarter of the frequency structure: referred as comb ¼ frequency structure). Thus, the group of Q symbols can be conveniently used for example as DMRS, with an overhead of 50% and a comb ¼ frequency structure. In yet another example, Q and possibly K can be chosen such that a target effective coding rate is achieved for the transmission of a the group of Q symbols: for conveying a given number of information bits, increasing Q allows a higher number of redundancy bits, and increasing K increases the number of repetitions.

Note that for a given M conveniently choosing K is equivalent to conveniently choosing L, since KL=M. A convenient choice of (K, L) fixes the frequency structure of the comb used by the sequence represented by the group of Q symbols. Furthermore, a convenient choice of Q fixes the amount of power utilized for conveying the sequence represented by the group of Q symbols (which can be interpreted either as the power boosting level onto the L subcarriers in the used comb, or the overhead of the sequence, or an indicator of the effective coding rate used by the sequence).

By DFT it is understood Discrete Fourier transform.

By IDFT it is understood inverse Discrete Fourier transform.

By samples of a symbol $X_n$ in the frequency domain and by samples of a symbol $X_n$ in the radio signal it is understood the result in the frequency domain of applying the DFT, respectively the result at the output of the IDFT of the processing of the DFTsOFDM scheme, on the block of symbols whose symbols are set to zero except for the symbol $X_n$ (such block of symbols being referred to as $X^{(n)}$). By analogy, by samples of a symbol $A_i$ in the frequency domain and by samples of a symbol $A_i$ in the radio signal it is understood result in the frequency domain of applying the DFT, respectively the result at the output of the IDFT of the processing of the DFTsOFDM scheme, on the block of symbols whose symbols are set to zero except for the symbols containing the symbol $A_i$, that is except for the symbols $X_{n_i+mL}$ with $M \in [\![0;K-1]\!]$.

These definitions are relevant since the DFT and the DFTsOFDM scheme are linear schemes.

Moreover, the samples of each symbol $X_n$ (or symbol $A_i$), which may overlap, contribute to the radio signal and/or to the frequency domain signal out-putted by the DFT. The radio signal issued from applying the scheme on block symbols $X=(X_0, \ldots, X_{M-1})$ is equal to the sum of the samples of the symbols $X_n$, n integer from 0 to M-1. Here, the samples of different symbols $X_n$ can be seen, from a mathematical point of view, as a multi-dimensional structure having as dimensions the size N of the IDFTs and the number of transmit antennas.

Therefore, by samples in the radio signal of the symbol $X_n$ of the block of symbols it is understood that there exists a value $\rho_n$ such as the samples in the radio signal can be obtained by applying the DFTsOFDM scheme to the block $X^{(1)}$, with the value of $X_n$ set to $\rho_n$. The samples in the radio signal of the symbol $A_i$ are defined relatively to the symbols $X_{n_i+mL}$, in the positions $n_i+mL$, that is the samples of the symbol $A_i$ is the sum of the samples of the symbols $X_{n_i+mL}$, with $m \in [\![0;K-1]\!]$. The value $\rho_n$ is hereinafter named corresponding value of the samples of the symbol $X_n$ of the block of symbols (or corresponding value of the symbol $X_n$).

This only defines the samples in the radio signal of the symbol $X_n$ or of the symbol $A_i$ but does not limit the way such samples can be obtained. Indeed, the samples in the radio signal of the symbol $X_n$ or of the symbol $A_i$ can be obtained in different ways.

For example, the symbols $X_{n_i+mL}$, in the positions $n_i+mL$ in the block of symbols are respectively set to the value $e^{j2\pi k(n_i+mL)/M}A_i$ and the DFTsOFDM scheme is applied to the block of symbols (referred to as pre-DFT incorporation).

In another example, the symbols $X_{n_i+mL}$, in the positions $n_i+mL$ in the block of symbols are respectively set to 0 in the block of symbols, and the samples in the frequency domain of the symbols $A_i$ are added at the output of the DFT, or at the input of the IDFT (referred to as post-DFT incorporation).

In yet another example, the symbols $X_{n_i+mL}$, in the positions $n_i+mL$ in the block of symbols are respectively set to 0 in the block of symbols, and the samples in the radio signal of the symbols $A_i$ are added at the output of the IDFT (referred to as post-IDFT incorporation).

However, like mentioned above, in all these cases the samples in the radio signal and the radio signal itself are fully defined as the result of the application of the DFTsOFDM scheme on a block of M symbols whose symbols are set to specific values. The specific value of the samples of the symbol $X_n$ is the corresponding value of the samples of the symbol $X_n$. The specific values of the sample $A_i$ are the corresponding values of the samples of the symbols $X_{n_i+mL}$, with $0 \le m < K$.

These specific values are theoretical when the Q symbols are added in the frequency domain or at the output of the IDFT.

The M−Q·K symbols other than the Q symbols defined according to the invention can be used freely, that is, with or without implementing them so that their samples in the frequency domain are arranged in a comb structure, and having these symbols result from any types of symbols such as control data, reference signal or user data.

For example, the Q symbols $A_i$ may be reference signals (issued from a CAZAC sequence or a advantageously Zadoff-Chu sequence) and the M−Q·K other symbols may contain user data and/or other control data and/or other type of reference signals. In contrary, the Q symbols $A_i$ may be user data and the M−Q·K other symbols may contain reference signals and/or also user data and/or control data etc.

The value $\rho_{n_i+mL}$ of the symbol $X_{n_i+mL}$ is $e^{j2\pi k(n_i+mL)/M}A_i$ Therefore, is one of the symbols of the block of symbols that conveys the symbol. $A_i$. At the receiver side the symbol $A_i$ can easily be retrieved from the samples of the symbols $X_{n_i+mL}$, with $0 \le m < K$. The symbol $A_i$ is for example a modulation symbol like a QPSK modulation symbol or a symbol from a given sequence such as a CAZAC sequence or a symbol from a predefined sequence with controlled PAPR for example. The symbols $X_{n_i+mL}$ are the symbol $A_i$ with phase shift. The values, to which the symbols $X_{n_i+mL}$ are set to, can be for examples phase shifted symbols of a digital modulation scheme, or phase shifted symbols taken from a CAZAC sequence or from another predefined sequence with controlled PAPR. Samples of the symbol $A_i$ are the same than the samples of the symbols $X_{n_i+mL}$, with $0 \le m < K$.

The index k and the integer K define the comb. Indeed, the comb defined by (k; K) (hereafter named comb k) occupies the subcarriers with the frequencies index k, k+K, k+2K, ..., k+(L−1)K. Therefore, the Q symbols $A_i$ occupy only the subcarriers corresponding to the comb k.

The transmit antenna is configured for transmitting on M frequencies, that is that the signal emitted by such transmitting antenna is provided by applying an N-size IDFT on M complex symbols, one complex symbol for each of the M allocated subcarriers. Previous to the IDFT, the M subcarriers may be mapped with a subcarrier mapping module on a greater number of N subcarriers. N−M of these subcarriers are not allocated subcarriers since they are set to zero, the M other subcarriers are M allocated subcarriers, on which the M complex symbols are mapped. In this case the IDFT module is of size N.

The radio signal is understood as the signal provided by the transmit antenna.

The scheme applied on the block of symbols is a DFT-sOFDM scheme, that is, successively applying a DFT module, a subcarrier mapping module and an IDFT module.

That is, a M size DFT is applied to the block of symbols $X=(X_0, \ldots X_{M-1})$, and for each $k^{th}$ frequency, with k=0 to M−1, a complex symbol $S_k$ in the frequency domain is obtained. At the output of the IDFT module corresponding to the transmit antenna a signal representing, in the frequency domain, complex symbols respectively function of $S_k$ for each $k^{th}$ frequency with k=0 to M−1 is obtained.

Therefore, when incorporating the Q symbols in a pre-DFT manner or in a post-IDFT manner, the scheme can be described as:

applying a M size DFT to a block of symbols $X(X_0, \ldots X_{M-1})$, and obtaining for each $k^{th}$ frequency, with k=0 to M−1, a complex symbol $S_k$ in the frequency domain;

obtaining, at an output of an IDFT module corresponding to a transmit antenna a signal representing, in the frequency domain, the complex symbols $S_k$ for each $k^{th}$ frequency with k=0 to M−1.

In addition, when incorporating the Q symbols in a post-DFT manner, the scheme can be described as:

applying a M size DFT to a block of symbols $X=(X_0, \ldots X_{M-1})$, and obtaining for each $k^{th}$ frequency, with k=0 to M−1, a complex symbol $S_k$ in the frequency domain;

obtaining, at an output of an IDFT module corresponding to a transmit antenna a signal representing, in the frequency domain, for each $k^{th}$ frequency with k=0 to M−1, the complex symbol $S_k$ to which has been added the samples in the frequency domain corresponding to the $k^{th}$ frequency of the Q symbols.

According to an aspect of the invention, transmitting the Q symbols is done by setting the symbol $X_{n_i+mL}$ to the value $e^{j2\pi k(n_i+mL)/M}A_i$, for each i and m.

In this embodiment the Q symbols are incorporated at a pre-DFT level, in the block of symbols. Such an implementation can easily be adapted in any standard emitter and therefore can be implemented in all transmitters. Moreover, there is no need for additional operations such as post-IDFT processing or memory storage of the samples of the Q symbols.

According to an aspect of the invention, the method further comprises setting the values of the symbols $X_{n_i+mL}$ to 0, with (i; m)∈〚0;Q−1〛×〚0;K−1〛, before applying the DFT and obtaining a subsequent signal at the output of the IDFT module;

and wherein for each i and m, transmitting the Q symbols is done by adding the samples in said subsequent signal at the output of the IDFT module.

This enables to process only the M−Q·K symbols of the block of symbols other than the Q symbols through the DFTsOFDM-like scheme. Therefore, the Q symbols can be processed in a different manner from the other symbols of the block of symbols. This enables for example to process the samples of the Q symbols once and for all. This enables for example to control the interferences of the samples of the Q symbols with the samples of the other symbols by specific processing applied onto the samples of the Q symbols and/or onto the samples of the other symbols.

The samples of the Q symbols are computed separately from the other symbols to obtain samples identical or at least equivalent (that is identical in regard to the high power samples) to those that would have been obtained by setting the Q symbols pre-DFT, that is by setting the values of the symbols $X_{n_i+mL}$, with (i; m)∈〚0;Q−1〛×〚0;K−1〛, to the corresponding values of the samples $X_{n_i+mL}$. The samples of the Q symbols may be samples computed by applying the specific scheme on the block of symbols with the values of the symbols $X_{n_i+mL}$, with (i; m)∈〚0;Q−1〛×〚0;K−1〛 set to the corresponding values of $X_{n_i+mL}$ (that is to $e^{j2\pi k(n_i+mL)/M}A_i$) and the values of the other symbols of the block of symbols set to 0.

The subsequent signal is the signal provided by the DFTsOFDM-like scheme at the output of the IDFT, which in this case is obtained by applying the scheme to a block of symbols where the values of the symbols $X_{n_i+mL}$ are set to 0, at least for some pairs of (i; m)∈〚0;Q−1〛×〚0;K−1〛, advantageously for all.

According to an aspect of the invention, the method further comprises setting the values of the symbols $X_{n_i+mL}$ to 0, with (i; m)∈〚0;Q−1〛×〚0;K−1〛, before applying the DFT and obtaining a subsequent signal at the output of the DFT module;

and wherein for each i and m, transmitting the Q symbols is done by adding the samples in said subsequent signal at the output of the DFT module.

This enables to process only the M−Q·K symbols of the block of symbols other than the Q symbols through the DFT. Therefore, the Q symbols can be processed in a different manner from the other symbols of the block of symbols. This enables for example to process the samples in the frequency domain of the Q symbols once and for all. This enables for example to control the interference of the samples of the Q symbols with the samples of the other symbols by specific processing (for example filtering the samples in the frequency domain).

The samples of the Q symbols are computed separately regarding the DFT from the other symbols to obtain samples identical or at least equivalent (that is identical in regard to the high power samples) to those that would have been obtained by setting the Q symbols pre-DFT, that is by setting the values of the symbols $X_{n_i+mL}$, with (i; m)∈〚0;Q−1〛×

〚0;K−1〛, to the corresponding values of the samples $X_{n_i+mL}$. The samples in the frequency domain of the Q symbols added at the output of the DFT module may be samples computed by applying the DFT on the block of symbols with the values of the symbols $X_{n_i+mL}$, with (i; m)∈〚0;Q−1〛×〚0;K−1〛 set to the corresponding values of $X_{n_i+mL}$ (that is to $e^{j2\pi k(n_i+mL)/M}A_i$) and the values of the other symbols of the block of symbols is set to 0.

The subsequent signal is the signal provided by the DFTsOFDM-like scheme at the output of the DFT, which in this case is obtained by applying the DFT to a block of symbols where the values of the symbols $X_{n_i+mL}$ are set to 0, at least for some pairs of (i; m)∈〚0;Q−1〛×〚0;K−1〛, advantageously for all.

According to an aspect of the invention, at least K' groups of $Q_p$ symbols $(A_0^p; \ldots; A_{Q_p-1}^p)$ are transmitted in the radio signal, with the $Q_p$ being strictly positive integers and $\Sigma Q_p \leq L$ and K'≤K, said method comprising for each p:

determining a $k_p$ integer and $Q_p$ positions of $n_i^p$ in the block of symbols such as $$\left\{ n_i^p \middle| \begin{array}{l} i \in [\![0; Q_p - 1]\!], 0 \leq n_i^p < L, \\ \forall (i; i') \in [\![0; Q_p - 1]\!]^2, i < i' \Rightarrow n_i^p < n_{i'}^p, \\ \forall p' \in [\![1; K']\!], p' \neq p \Rightarrow \forall (i; i') \in [\![0; Q_p - 1]\!]^2, n_i^{p'} \neq n_{i'}^p \end{array} \right\} ; \text{ and}$$

$$0 \leq k_p < K, \forall p' \in [\![1; K']\!], p' \neq p \Rightarrow k_p \neq k_{p'}$$

transmitting the $Q_p$ symbols through the radio signal, such as for each i, samples of the symbol $A_i^p$ in the radio signal are equal to a result outputted by the IDFT module, of the application of the DFT to a block of M symbols with values of symbols $X_{n_i^p+mL}$, in the positions $n_i^p+mL$, are respectively $e^{j2\pi k_p(n_i^p+mL)/M}A_i^p$, with m∈〚0;K−1〛.

This enables to process several groups of symbols such that the samples of the symbols of each group are arranged in a comb structure in the frequency domain while preserving the single carrier property of the DFTsOFDM scheme. Each comb being defined by its index $k_p$ and by K. Indeed, the comb defined by $(k_p;K)$ (hereafter named comb $k_p$) occupies the subcarriers with the frequencies index $k_p$, $k_p+K$, $k_p+2K$, . . . , $k_p+(L-1)K$. Therefore, each comb occupies different frequencies in the frequency domain and does not overlap with the other combs. Thus, each group of $Q_p$ symbols $A_i^p$ are processed such as to be orthogonal in the frequency domain to the other groups, which enables at the receiver side to easily retrieve from the radio signal each group of $Q_p$ symbols $A_i^p$. Indeed, being orthogonal in the frequency domain enables to separate the groups of $Q_p$ symbols from each other at the receiver side, simplifying the frequency domain processing at the receiver.

Each group of symbols can be used for a specific type of symbol for example reference signals or other control data or user data. Therefore, all the symbols of each group can be of a specific type enabling to easily separate the different types of symbols at the receiver side enabling to process them independently from each other. Therefore, types of symbols or more generally groups of symbols needing different types of processing at the receiver side can be multiplexed within one DFTsOFDM symbol.

For example, such processing at the receiver enables to extract the reference signals to evaluate the channel perturbation (phase shift, amplitude . . . ) which has altered the radio signal and to adapt the decoding modules to compensate these perturbations, which enables to enhance the efficiency of the decoding of the radio signal.

The size of each group of symbols $Q_p$ can be chosen regarding the quality of the transmission required for the symbols of that group. For example, a group of symbol transmitting control data may need a transmission with low error occurrence whereas the consequences of error occurring on the transmission of symbols from a group of symbols that transmit data may be less critical for the communication.

According to an aspect of the invention, if $\Sigma Q_p \neq L$, $\forall n \neq n_i^p$, with (i; p)∈〚0;Q−1〛×〚1;K'〛, the values of the symbols $X_n$ is set to 0 before applying the DFT.

This enables to enhance the transmission of the symbols of the K' groups of $Q_p$ symbols. Indeed, each group of $Q_p$ symbols $A_i^p$ are frequency domain orthogonal and no interference from other symbols of the block of symbols can occur since they are set to zero.

According to an aspect of the invention K'<K.

This enables to leave combs unused. Indeed, in the frequency domain a maximum of K combs of size L can be used, when setting K'<K only K' combs are used leaving K−K' combs left unused. These unused combs, which are frequency domain orthogonal to the other used combs, can be used in a transmission implemented by another emitter. For example, two mobile devices communicating with the same base station may use different combs to implement an uplink transmission, therefore, at the base station it is easy to separate in the frequency domain the uplink signals from each mobile device.

According to an aspect of the invention K'=K.

This enables to use all the combs in the transmission, that is, to use all the subcarriers available in the transmission, reducing the interferences between symbols of the block of symbols and enhancing the transmission capacity.

According to an aspect of the invention for at least one p, $L=Q_p c$, with c positive integer, and $$\left\{ n_i^p \middle| \begin{array}{l} \forall i \in [\![0; Q_p - 2]\!], n_{i+1}^p - n_i^p = c \\ n_0^p + L - n_{Q_p-1}^p = c \end{array} \right\}.$$

In this case, the symbols in the block of symbols which carry the $Q_p$ symbols are arranged in a comb in the time domain. When applying the DFT on the block of symbols the samples of the $Q_p$ symbols in the frequency domain are in comb $k_p$. Moreover, due to the comb structure in the time domain, the samples in the frequency domain of the $Q_p$ symbols which occupy the subcarrier $k_p$ are identical to the ones occupying the subcarriers $k_p+KQ_p$, $k_p+2KQ_p$, . . . , $k_p+(c-1)KQ_p$.

The samples in the frequency domain of symbols of the $Q_p$ symbols which occupy the subcarrier $k_p+K$ are identical to the ones occupying the subcarriers $k_p+K(Q_p+1)$, $k_p+K(2Q_p+1)$ $k_p+K((c-1)Q_p+1)$.

This repetition pattern with a step of $KQ_p$ in the frequency domain occurs with the samples of the $Q_p$ symbols occupying the $k_p+2K$, . . . , $k_p+(Q_p-1)K$.

Therefore in the frequency domain the samples of the $Q_p$ symbols have a repetitive structure. This repetitive structure reduces the complexity of the computing to retriever the symbols. Indeed, the receiver will receive several times the same complex symbols on different subcarriers which reduces the consequences of the deterioration of these complex symbols during their transmission through the radio channel and of the interferences.

In addition, this repetitive structure reduces the complexity of the computing to process the $Q_p$ symbols especially when the symbols are not incorporated in a pre-DFT manner. Indeed, in that case only the samples in the frequency domain on the first $Q_p$ subcarriers of the $k_p$ comb need to be computed, that is the samples on the subcarriers of the comb $k_p$ indexed by $k_p$, $k_p+K$, $k_p+2K$, . . . , $k_p+(Q_p-1)K$.

Like mentioned previously the phase shift repetition of symbols in the time domain can be advantageously used to transmit reference signals. Moreover, to track fast phase shift it is advantageous when the symbols in the block of symbols which carry the $Q_p$ symbols are arranged in a comb in the time domain since then not only the symbol $A_i$ and all its phase shifted copies are temporally distributed but all the symbols $A_i$ and their phase shifted copies are temporally distributed in the DFTsOFDM symbol. That is, the symbols which carry the $Q_p$ symbols are arranged in a comb with a step of c in the time domain. Therefore, this structure is particularly relevant for incorporating reference signals.

According to an aspect of the invention for at least one p $\{n_i^p | n_{Q_p-1}^p - n_0^p = Q_p-1\}$.

In this case the symbols in the block of symbols which carry the $Q_p$ symbols are arranged in a localized manner in the time domain, that is, for each m from 0 to K−1 the symbols $X_{n_0+mL}$, $X_{n_1+mL}$, $X_{n_{K-1}+mL}$, are contiguous symbols in the block of symbols.

Therefore, it is easier for the receiver to separate in the time domain the $Q_p$ symbols from the other symbols. Indeed, contiguous symbols in the time domain in the block of symbols, generates contiguous samples in the radio signal once the DFTsOFDM scheme is applied. Thus, the receiver can extract these contiguous samples in the radio signal (for example using time window) in a less complex manner (at the most K time windows are required) than if they were distributed in the DFTsOFDM symbol (may require K·L time windows).

In addition, the M−$Q_p$ other symbols in the block of symbols interferes less in the time domain onto the $Q_p$ symbols. Indeed, the $Q_p$ symbols are protected from interferences from the other symbols by the first symbols carrying $A_0$ ($X_{n_0}$, $X_{n_0+L}$, $X_{n_0+2L}$, etc.) and by the last symbols carrying $$A_{Q_p-1}(X_{n_{Q_p-1}}, X_{n_{Q_p-1}+L}, X_{n_{Q_p-1}+2L}, \text{etc.})$$

of the temporally contiguous symbols.

Due to the comb structure in the frequency domain it is then possible to reduce in the frequency domain the interferences onto the extracted part of the radio signal containing the $Q_p$ symbols.

Moreover, due to the localized structure in the time domain, the samples of the $Q_p$ symbols in the frequency domain are an oversampling of the result of a $Q_p$-size DFT applied on the $Q_p$ symbols ($A_0$, . . . $A_{Q_p-1}$). The result of such a $Q_p$-size DFT applied on a CAZAC sequence, or more specifically a Zadoff-Chu sequence, is also a CAZAC sequence, respectively a Zadoff-Chu sequence. The oversampling of this result is the samples in the frequency domain of these Q symbols (generated from a CAZAC sequence or a Zadoff-Chu sequence). This oversampling has low envelope variations, that is, a low PAPR, and has some orthogonal multiplexing capacity. In addition, such oversampling enables to add samples of the $Q_p$ symbols directly in the frequency domain with low computing complexity.

A second aspect of the invention concerns a computer program product comprising code instructions to perform the method as described previously when said instructions are run by a processor.

A third aspect of the invention concerns a device for transmitting at least a group of Q symbols ($A_0$; . . . ; $A_{Q-1}$) in a radio signal to be transmitted over a wireless communication system, said radio signal being intended to be emitted by an emitter comprising at least one transmit antenna configured for transmitting on at least a number M, of different frequencies, M being equal to L·K with L and K strictly positive integer and Q being a strictly positive integer strictly smaller than L, said radio signal being provided by:

applying a M size DFT module to a block of symbol $X(X_0, \ldots X_{M-1})$, and obtaining for each $k^{th}$ frequency, with k=0 to M−1, a complex symbol $S_k$ in the frequency domain;

obtaining, at an output of an IDFT module corresponding to a transmit antenna a signal representing, in the frequency domain, the complex symbols $S_k$ for each $k^{th}$ frequency with k=0 to M−1;

emitting the radio signal corresponding to the signal;

said device being configured to:

determine Q positions $n_i$ in the block of symbols, such as $\{n_i | i \in [\![0;Q-1]\!], 0 \leq n_i < L, \forall i, i' \in [\![0;Q-1]\!]^2, i' \Rightarrow n_i < n_{i'}\}$;

transmit the Q symbols through the radio signal, such as for each i, samples of the symbol a; in the radio signal are equal to a result outputted by the IDFT module, of the application of the DFT to a block of M symbols with values of symbols $X_{n_i+mL}$, in the positions $n_i+mL$, are respectively $e^{j2\pi k(n_i+mL)/M} A_i$, with k integer such as 0≤k<K, with m integer such as 0≤m<K, and j the imaginary number.

The present invention is illustrated by way of example, and not by way of limitations, in the figures of the accompanying drawings, in which like reference numerals refer to similar elements.

BRIEF DESCRIPTION OF DRAWINGS

FIG. 7.1 illustrates a flowchart representing the steps of pre-DFT incorporating the symbols according to the invention.

FIG. 7.2 illustrates a flowchart representing the steps of post-DFT incorporating the symbols according to the invention.

FIG. 7.3 illustrates a flowchart representing the steps of post-IDFT incorporating the symbols according to the invention.

DESCRIPTION OF EMBODIMENTS

Figure 1:
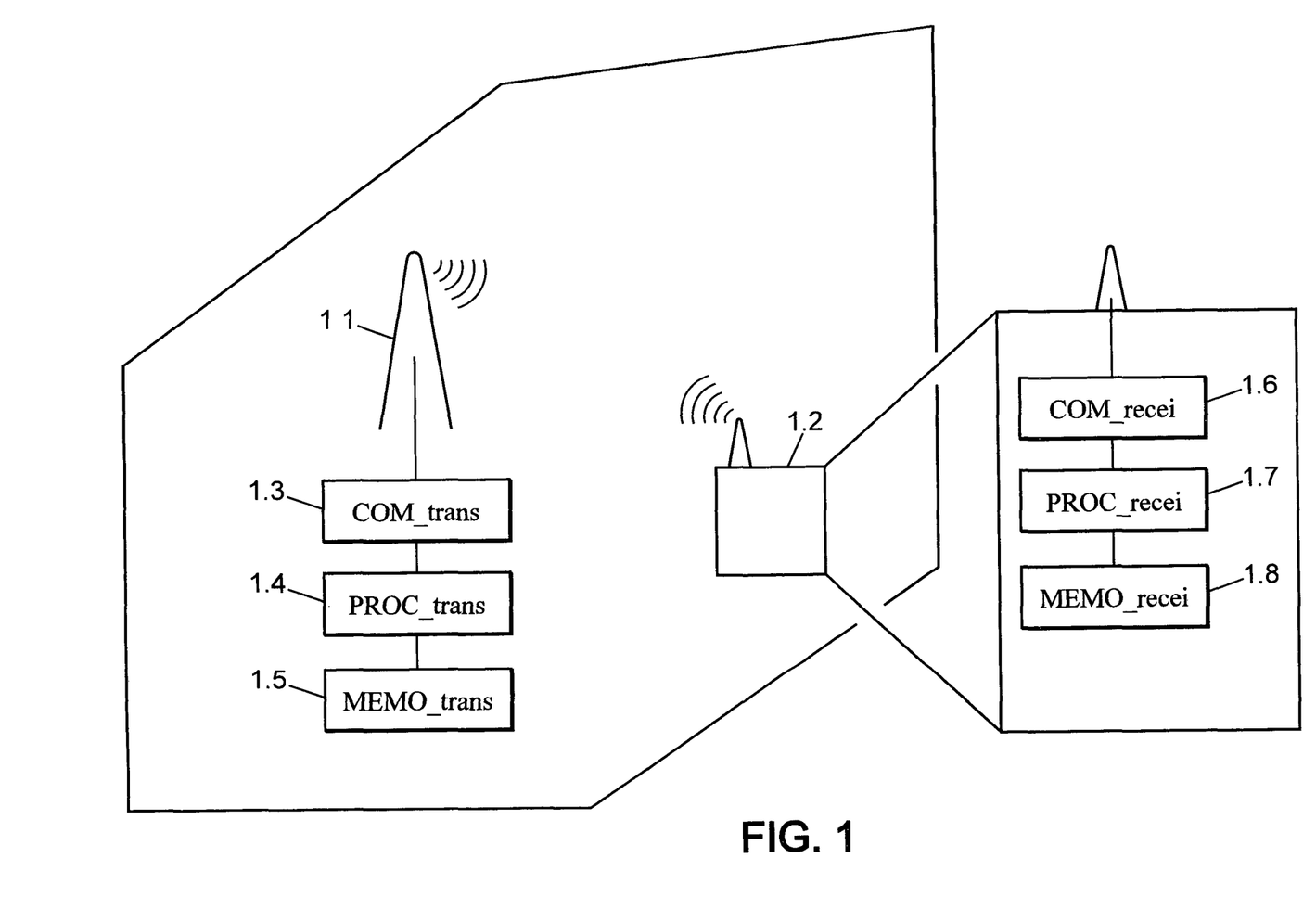
FIG. 1 illustrates a DFTsOFDM type transmitter and receiver.

Referring to FIG. 1, there is shown a transmitter 1.1 transmitting a radio signal to a receiver 1.2. The receiver 1.2 is in the cell of the transmitter 1.1. This transmission is a DFTsOFDM based transmission in the context of OFDM based system. In this example the transmitter 1.1 is a fixed station and the receiver 1.2 is a mobile terminal, in the context of LTE they would be named a base station and a user equipment. The transmitter 1.1 can as well be the mobile terminal and the receiver 1.2 a fixed station.

The transmitter 1.1 comprises one communication module (COM_trans) 1.3, one processing module (PROC_trans) 1.4 and a memory unit (MEMO_trans) 1.5. The MEMO_trans 1.5 comprises a non-volatile unit which retrieves the computer program and a volatile unit which retrieves symbol incorporation parameters. The PROC_trans 1.4 is configured to transmit the Q symbols according to the invention. The COM_trans 1.3 is configured to transmit to the receiver 1.2 the radio signal. The communication module 1.3, the processing module 1.4 and the memory unit 1.5 may constitute the device for transmitting the Q symbols, as previously described.

The receiver 1.2 comprises one communication module (COM_recei) 1.6, one processing module (PROC_recei) 1.7 and a memory unit (MEMO_recei) 1.8. The MEMO_recei 1.8 comprises a non-volatile unit which retrieves the computer program. The PROC_recei 1.7 is configured to retrieve the Q symbols from the radio signal. The COM_recei 1.6 is configured to receive from the transmitter 1.1 the radio signal.

Figure 2:
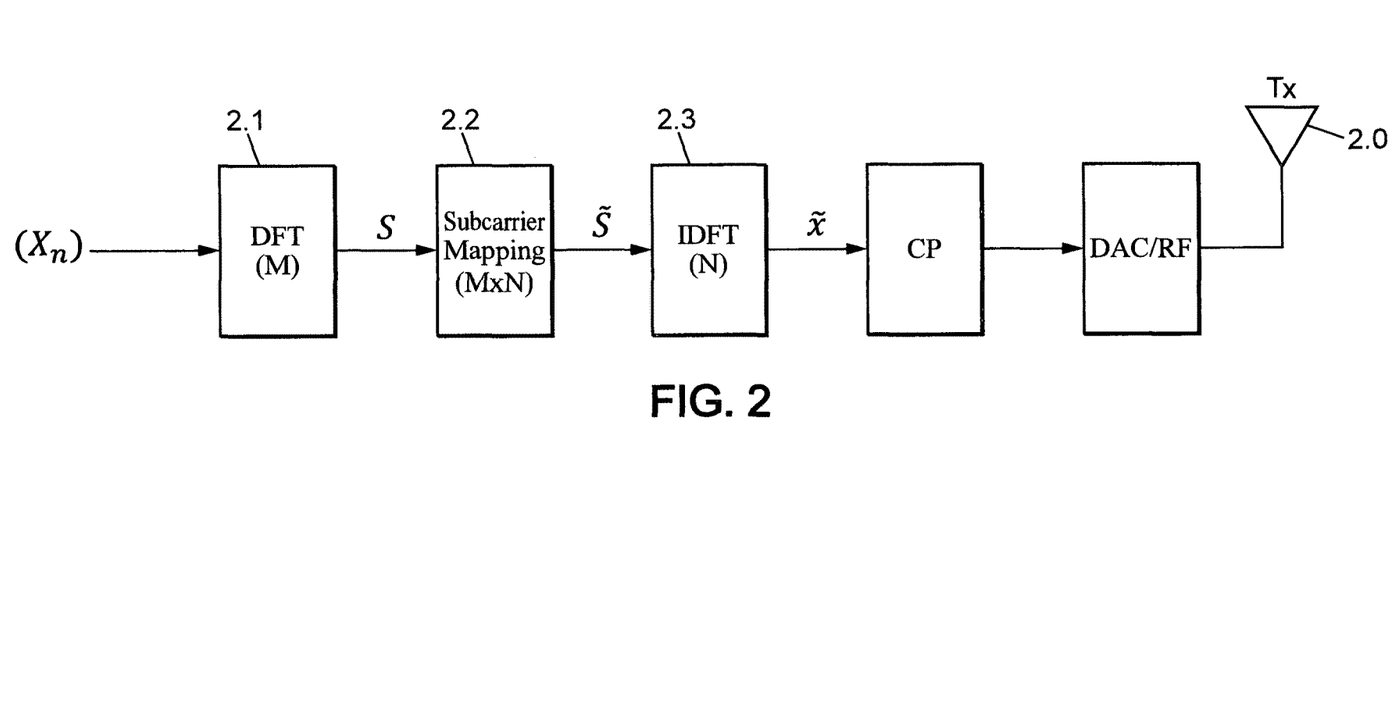
FIG. 2 schematizes a block diagram of a classical DFTsOFDM transmitter.

Referring to FIG. 2, there is shown a block diagram of a classical DFTsOFDM transmitter 1.1. Such DFTsOFDM transmitter applies a DFTsOFDM scheme on a block of symbols $(X_0, \ldots X_{M-1})$ to obtain the radio signal. Such DFTsOFDM scheme has a single carrier property which ensures low Peak-to-Average Power Ratio (PAPR), depending on the PAPR of the block of symbols present at the input of the DFT. In the example of FIG. 2 the DFTsOFDM transmitter emits a radio signal by emitting on one transmit antenna Tx 2.0, this is none limiting and the DFTsOFDM transmitter can as well transmit by using several transmit antennas.

To provide the radio signal a M-size DFT (discrete Fourier transform) module 2.1 is applied to the block of symbols $X=(X_0, \ldots X_{M-1})$. The symbols of the block of symbols may be obtained by a QPSK digital modulation scheme or any other digital modulation scheme as QAM, or may be symbols of a sequence with controlled PAPR (e.g. a CAZAC sequence).

At the output of the DFT module 2.1, M complex symbols are obtained in the frequency domain, which are $(S_l)_{l \in [\![0;M-1]\!]}$. That is, one complex symbol is obtained for each l-th subcarrier among the M allocated subcarriers. These complex symbols are mapped, with a subcarrier mapping module 2.2 in the frequency domain to M out of N inputs of a N-size IDFT module 2.3. Regarding the subcarrier mapping, the vector of complex symbols $S=(S_l)_{l \in [\![0;M-1]\!]}$ is mapped to the M allocated subcarriers out of N existing subcarriers via subcarrier mapping module 2.2. The subcarrier mapping can be for example localized, that is, the M elements of the vector S are mapped to M consecutive subcarriers among the N existing. The subcarrier mapping can be for example distributed, that is the M elements of the vector S are mapped equally distanced over the entire bandwidth with zeros occupying unused subcarriers.

N-size inverse DFT module 2.3 is then applied to the resulting vector g of the subcarrier mapping module 2.2, therefore generating a DFTsOFDM symbol which is transmitted via the transmit antenna 2.0. More precisely, at the output of the IDFT module 2.3 a signal $\tilde{x}=(\tilde{x}_0, \ldots, \tilde{x}_{N-1})$ is obtained. This signal occupies during a time interval corresponding to a DFTsOFDM symbol, M allocated subcarriers out of the N existing subcarriers. The signal 2 is a time-domain signal whose frequency-domain representation, during the time interval, are the complex symbols $S_l$ for each $l^{th}$ occupied subcarrier with l=0 to M-1. This time-domains signal 2 corresponds to a DFTsOFDM symbol. Therefore, samples in the signal 2 refer to samples in a DFTsOFDM symbol.

A cyclic prefix can be optionally appended after IDFT.

Figure 3:
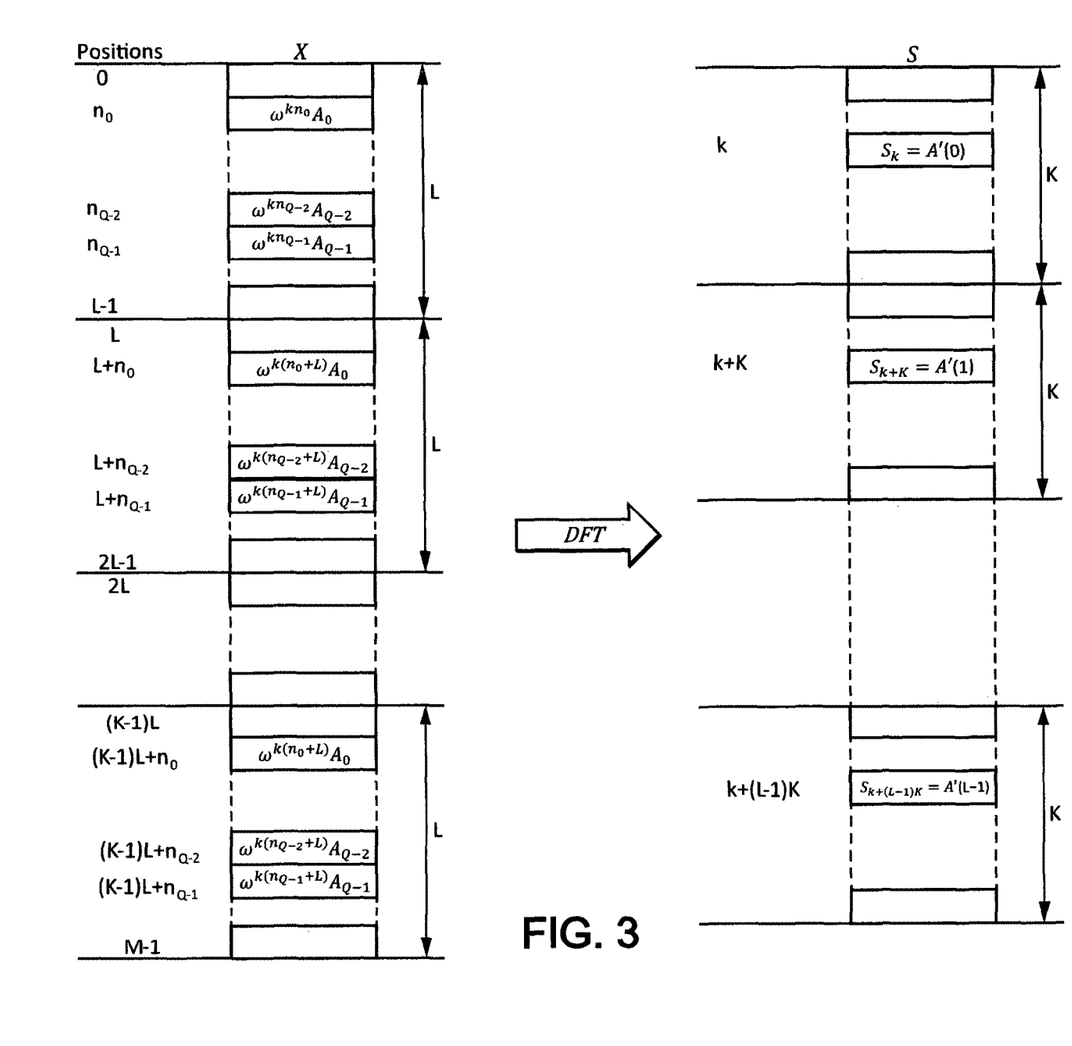
FIG. 3 details an example of localization of the Q symbols in the block of symbols according to the invention.

Referring to FIG. 3, there is shown an example of localization of the Q symbols in the block of symbols according to the invention.

The Q symbols are positioned in specific positions in the block of symbols $X=(X_0, \ldots X_{M-1})$ enabling to obtain the samples in the frequency domain resulting from these Q arranged in a comb structure.

For each symbol $A_i$ a phase shifted repetition is operated in the symbols $X_{n_i+mL}$ of the block of symbols. That is, the symbols $X_{ni+mL}$, in the positions $n_i+mL$, are respectively set to $\omega^{k(n_i+mL)} A_i$, with $\omega=e^{j2\pi/M}$. Therefore, the symbols $X_{n_i+mL}$ with m from 1 to K−1 are phase shifted repetition from $X_{n_i}$ which is set to $\omega^{kn_i} A_i$. Therefore, the symbols $X_{n_i}$, $X_{n_i+L}, \ldots X_{n_i+QL}$ are shifted repetition of the symbol $A_i$.

When applying the M size DFT module 2.1 on such a block of symbols the only complex symbols in the frequency domain which result (at least partly) from the Q symbols, that is, from the $X_{n_i+mL}$ with $(i; m) \in [\![0;Q-1]\!] \times [\![0;K-1]\!]$, are the complex symbols occupying the k-th comb. These complex symbols are $S_k, S_{k+K}, S_{k+(L-1)K}$. Therefore, samples of the Q symbols in the frequency domain only occupy the subcarriers of the k-th comb. The k-th comb or comb k is a subcarrier comb made of the subcarriers of index k+m·K with m from 0 to K−1.

For the sake of simplification, in FIG. 3 the $S_{k+qK}$ are considered as resulting only from the Q symbols, that is, $S_{k+qK}=A'(q)$ with $A'(q)$ defined by the $A_i$ with $i \in [\![0;Q-1]\!]$. However, if symbols in different positions than the $n_i+m \cdot L$ are set to non-nul values, then samples in the frequency domain of these symbols may occupy subcarriers of the k-th comb. These samples can be considered as interference regarding the Q symbols.

In the example of FIG. 3 the DFT is applied on the block of symbols in which the Q symbols are previously incorporated. It is referred to such embodiment as pre-DFT incorporation of the Q symbols.

Figure 4:
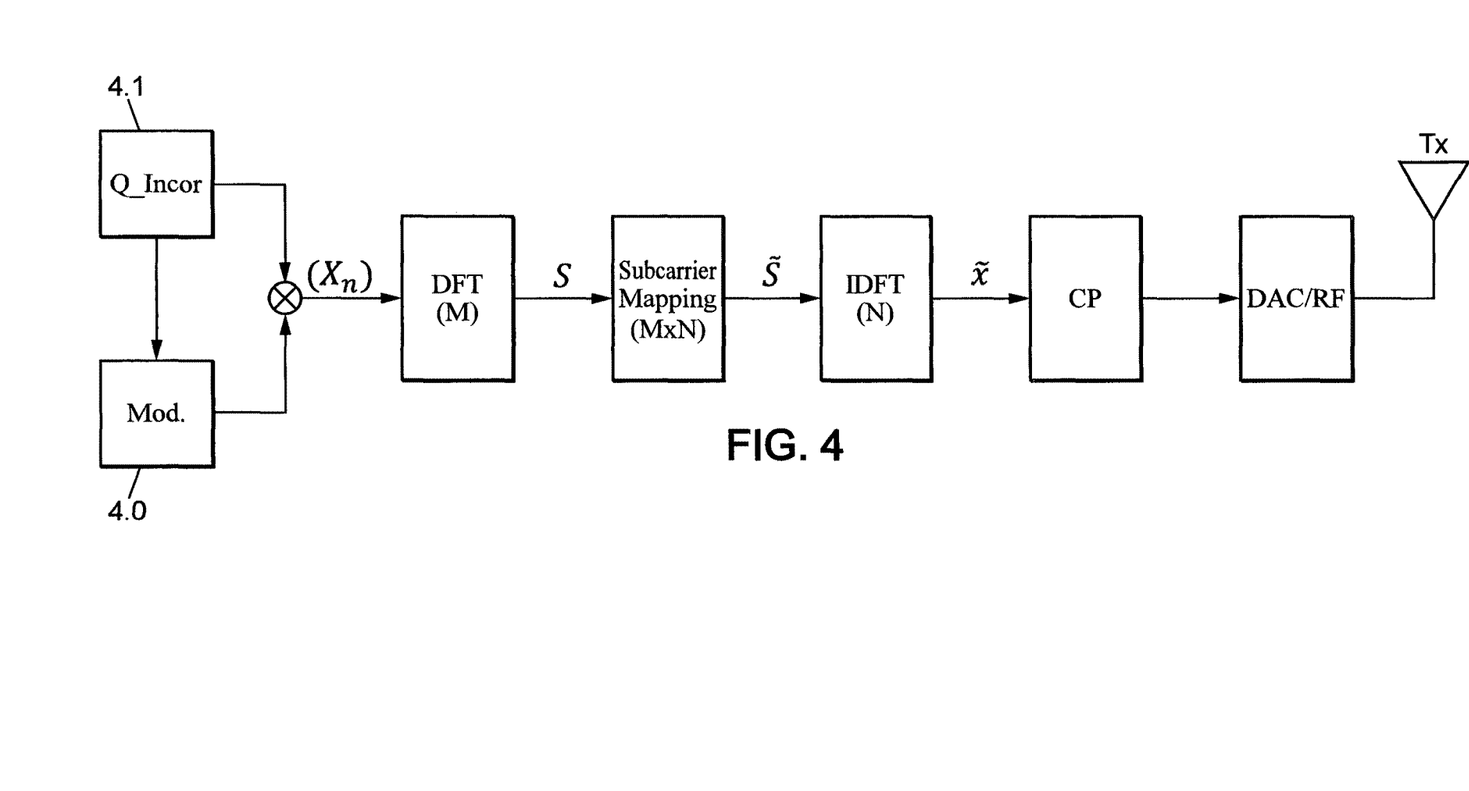
FIG. 4 schematizes a block diagram of pre-DFT incorporation of Q symbols according to the invention.

FIG. 4 is a block diagram of a DFTsOFDM transmitter where the incorporation of Q symbols according to the invention is a pre-DFT incorporation.

The DFTsOFDM scheme applied is identical to the one described in FIG. 2. Therefore, a M-size DFT module, a subcarrier mapping module and a N size IDFT module are successively applied to the block of symbols $X=(X_0, \ldots X_{M-1})$ to obtain the radio signal emitted by Tx. Like previously mentioned in pre-DFT incorporation of the Q symbols, the values of the symbols $X_{n_i+mL}$ are set to $\omega^{k(n_i+mL)} A_i$, with $(i; m) \in [\![0;Q-1]\!] \times [\![0;K-1]\!]$.

A modulator module 4.0 is configured to insert modulation symbols into the block of symbols in positions that do not conflict with the positions $n_i+mL$ with $(i; m) \in [\![0;Q-1]\!] \times [\![0;K-1]\!]$. In addition, an incorporator module 4.1 is configured to add the symbols $X_{n_i+mL}$ set to $\omega^{k(n_i+mL)} A_i$ in the block of symbols. The incorporator module 4.1 may be configured to inform or configure the modulator module 4.0 to avoid the insertion of modulation symbols into the block of symbols in positions that do not conflict with the positions $n_i+mL$ with (i; m)∈〚0;Q-1〛×〚0;K-1〛.

Therefore, previously to the incorporation of the Q symbols, the incorporator module 4.1 determines the Q positions $n_i$ in the block of symbols, such as $\{n_i | i \in 〚0;Q-1〛, 0 \le n_i < L, \forall i, i' \in 〚0;Q-1〛^2, i' \Rightarrow n_i < n_{i'}\}$.

The incorporator module 4.1 may be configured in a static way by previously configuring the positions $n_i$ with i∈〚0;Q-1〛. Several configurations may also be previously programmed, for example one configuration for each number Q, or a limited number of configurations for each number Q. Configuration can be done in an implicit manner (for example based on other parameters known by the transmitter), or in an explicit manner (for example based on instructions given by the base station via, e.g., a control channel), or a combination of the two.

In the case described in FIG. 3 only one group of Q symbols is incorporated in the block of symbols according to the invention. However, several groups of symbols can be incorporated in the same manner as previously described with the exception that each group is related to a different comb.

In the case K' groups of $Q_p$ symbols $(A_0^P; \ldots; A_{Q_p-1}^P)$ are incorporated in the block of symbols, the incorporator module 4.1 determines, for each p from 1 to K', a $k_p$ integer and $Q_p$ positions $n_i^p$ in the block of symbols such as $$\left\{ n_i^p \middle| \begin{array}{c} i \in 〚0; Q_p - 1〛, 0 \le n_i^p < L, \\ \forall (i; i') \in 〚0; Q_p - 1〛^2, i < i' \Rightarrow n_i^p < n_{i'}^p, \\ \forall p' \in 〚1; K'〛, p' \ne p \Rightarrow \forall (i; i') \in 〚0; Q_p - 1〛^2, n_i^{p'} \ne n_{i'}^p \end{array} \right\}; \text{ and}$$

$$0 \le k_p < K, \forall p' \in 〚1; K'〛, p' \ne p \Rightarrow k_p \ne k_{p'}$$

The incorporator module 4.1 is then configured to add the symbols $X_{n_i^p+mL}$ set to $\omega^{k_p(n_i^p+mL)} A_i^p$ in the positions $n_i^p+mL$ in the block of symbols. The modulator module 4.0 is configured accordingly. Each of the $Q_p$ group of symbols is therefore incorporated in the same manner as if only one group of symbols is incorporated according to the invention.

In addition, the complex symbols issued from each group of $Q_p$ symbols on which the DFT has been applied, are on subcarriers of different combs. Therefore, samples in the frequency domain of symbols of the $Q_p$ group are on the $k_p$-th comb, while samples in the frequency domain of symbols of the $Q_{p'}$ group are on the $k_{p'}$-th comb. Thus, the samples in the frequency domain of symbols of different groups do not superpose, they are frequency domain orthogonal.

Due to the frequency domain orthogonal of each group of symbols, symbols from each group do not interfere with each other.

When the Q symbols (in the case where only one group of symbols is incorporated) or the symbols of the K' groups of $Q_p$ symbols do not occupy the complete block of symbols, it is advantageous to set the other symbols of the block of symbols to zero. As previously mentioned, this avoids interference from other symbols of the block of symbols to occur onto the symbols incorporated. The modulator module 4.0 is then configured to set the symbols to zero in the positions where no symbols are incorporated by the incorporator module 4.1. Therefore, in this case the block of symbols at the output of the modulator module 4.0 is only composed of zeros.

In case several groups of symbols are incorporated using K' different combs in the frequency domain, the number K' of combs can be set to be strictly smaller than K. That is, the combs $k_1, \ldots, k_{K'}$ do not occupy all the subcarriers in the frequency domain, at least a group of subcarriers forming another comb is left unused. Therefore, when several transmitters like the transmitter 1.1 are nearby and could induce interferences on the signal of each other, one transmitter can emit symbols according to the invention using the combs $k_1, \ldots, k_{K'}$ and the other transmitters can use different combs, that is combs containing the subcarriers with the index k+mK, with m from 0 to L-1 and k different from $k_1, \ldots, k_{K'}$. Therefore, the radio signals emitted by the transmitters are orthogonal in the frequency domain, and thus they do not induce interferences to each other and are easy to separate in the frequency domain at the receiver. This is specifically relevant when the transmitters are mobile terminals in the same cell of a base station, therefore, the incorporation is implemented in an uplink transmission. This is also relevant when the transmitters are base stations that are close to each other, for example in an urban context.

Alternatively, to the embodiment where the transmitter 1.1 uses combs that do not occupy all the subcarriers, the transmitter 1.1 incorporates K' groups of symbols according to the invention that uses all the subcarriers, that is K'=K. Therefore, each of the subcarriers have an index pertaining to one combs $k_1$ to $k_{K'}$. This enables to use all the combs for transmitting according to the invention. That is, to use all the subcarriers available in the transmission for transmitting symbols of the K' groups of $Q_p$ symbols. Therefore, the maximum subcarriers are used for transmission of the symbols of the K' groups of $Q_p$ symbols enabling to reduce the interferences.

Alternatively or in combination with the other embodiment the symbols from a group of $Q_p$ symbols can be arranged in a comb in the block of symbols, that is, in the time domain. That is, for each pair (i; m)∈〚0;Q-2〛×〚0;K-1〛 two symbols $X_{n_i+mL}$ and $X_{n_{i+1}+mL}$ (that convey symbols of the group of $Q_p$ symbols) are spaced from c−1 positions in the block of symbols. That is, the $Q_p$ positions n' in the block of symbols are determined such as $\{n_i^p | \forall i \in 〚0;Q_p-2〛, n_{i+1}^p - n_i^p = c \text{ and } n_0^p + L - n_{Q_p-1}^p = c\}$,
with $L=Q_p c$ and with c positive integer. Therefore, the incorporator module 4.1 is configured to add the symbols $X_{n_i^p+mL}$ set to $\omega^{k_p(n_i^p+mL)} A_i^p$ in the positions in the block of symbols according to these determined positions.

As mentioned previously, this involves that the samples in the frequency domain of symbols of the group of $Q_p$ symbols which occupy the subcarrier $k_p$ are identical to the ones occupying the subcarriers $k_p+KQ_p, k_p+2KQ_p, \ldots, k_p+(c-1)KQ_p$. If the other symbols in the block of symbols are zeros or also arranged in the frequency domain to occupy a comb, that is, if no interference from other symbols occurs, then the complex symbols $S_{k_p}, S_{k_p+KQ_p}, S_{k_p+2KQ_p}, \ldots, S_{k_p+(c-1)KQ_p}$ are identical.

The samples in the frequency domain of symbols of the group of $Q_p$ symbols which occupy the subcarrier $k_p+K$ are identical to the ones occupying the subcarriers $k_p+K(Q_p+1), k_p+K(2Q_p+1), k_p+K((c-1)Q_p+1)$. If the other symbols in the block of symbols are zeros or also arranged in the frequency domain to occupy a comb, that is, if no interference from other symbols occurs, then the complex symbols $S_{k_p+K}, S_{k_p+K(Q_p+1)}, S_{k_p+K(2Q_p+1)}, \ldots, S_{k_p+K((c-1)Q_p+)}$ are identical.

The samples occupying the $k_p+2K, \ldots, k_p+(Q_p-1)K$ are also repeated in the same manner.

Therefore in the frequency domain the samples of the symbols of the group of $Q_p$ symbols have a repetitive structure. This repetitive structure reduces the complexity of the computing to retrieve the symbols. Indeed, the receiver will receive several times the same complex symbols on different subcarriers which reduces the consequences of the deterioration of these complex symbols during their transmission through the radio channel and of the interferences.

Alternatively or in combination with the other embodiments the symbols from a group of $Q_p$ symbols can be arranged contiguously in the block of symbols (in the time domain). That is, for each pair (i; m)∈〚0;Q-2〛×〚0;K-1〛 two symbols $X_{n_i+mL}$ and $X_{n_{i+1}+mL}$ (that convey symbols of the group of $Q_p$ symbols) are on contiguous positions in the block of symbols. That is, $\{n_i^p | n_{Q_p-1}^p n_0^p = Q_p-1\}$. Therefore, the incorporator module 4.1 is configured to add the symbols $X_{n_i^p+mL}$ set to $\omega^{k(n_i^p+mL)} A_i^p$ according to these determined positions in the block of symbols.

The Q (or $Q_p$ symbols) symbols may be symbols of any types of symbols such as control data, reference signals or user data. When the Q symbols are reference signal symbols, advantageously the Q symbols may be chosen as a CAZAC sequence, advantageously the Q symbols may be chosen as a Zadoff-Chu sequence.

Figure 5:
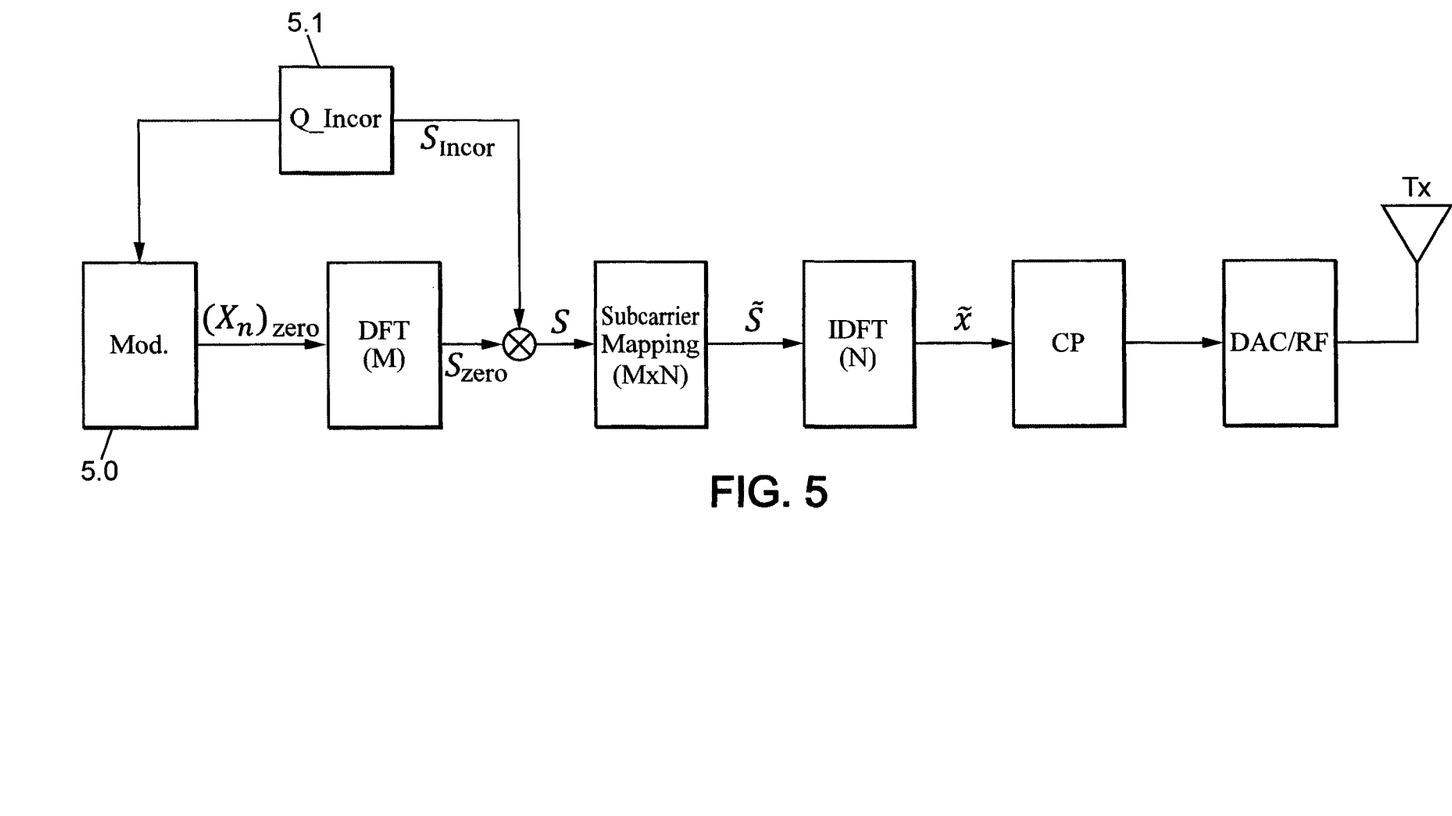
FIG. 5 schematizes a block diagram of post-DFT incorporation of Q symbols according to the invention.

Referring to FIG. 5, there is shown a block diagram of post-DFT incorporation of the Q symbols according to the invention. This embodiment can be applied as described hereafter to each of the K' groups of $Q_p$ symbols.

In this embodiment, the incorporation of the Q symbols is not done in the block of symbols (that is by setting directly the values of the symbols of the block of symbols as shown in FIG. 4). The incorporation is done post-DFT.

The scheme applied is identical to the one shown in FIG. 2, therefore, the different modules will be referenced with the same references.

The modulator module 5.0 is configured to set the values of the symbols $X_{n_i+mL}$ with (i; m)∈〚0;Q-1〛×〚0;K-1〛 to 0 before applying the DFT module 2.1. The modulator module 5.0 may be configured by the incorporator module 5.1, which can send the position configuration. The other symbols of the block of symbols may be set freely by the modulator module 5.0.

On this incomplete block of symbols $X_{Zero}$, the DFT module 2.1 is applied. At the output of the DFT module 2.1, M complex symbols are obtained in the frequency domain, which are $$S_{Zero} = (S_{l,Zero})_{l \in \llbracket 0;M-1 \rrbracket}.$$

These M complex symbols form the subsequent signal at the output of the DFT module 2.1.

The incorporator module 5.1 adds to the subsequent signal $S_{Zero}$ at the output of the DFT module 2.1 the signal $S_{Incor}$. The signal $S_{Incor}$ is for example pre-computed samples of the symbols $X_{n_i+mL}$ with (i; m)∈〚0;Q-1〛×〚0;K-1〛. That is, rather than setting the values of the symbols $X_{n_i+mL}$ with (i; m)∈〚0;Q-1〛×〚0;K-1〛 in the block of symbols, the samples of the Q symbols are computed to obtain samples identical or at least equivalent to those that would have been obtained, at the output of the DFT, for example if the values of these symbols where set pre-DFT (directly in the block of symbols) as previously described. For example, $S_{Incor}$ can be obtained by applying a DFT to a block of symbols where the values of the symbols $X_{n_i+mL}$ with (i; m)∈〚0;Q-1〛×〚0;K-1〛 are set respectively to the values $\omega^{k(n_i+mL)} A_i$.

Then the complex symbols resulting from the sum of $S_{Incor}$ and $S_{Zero}$ are mapped, as described in FIG. 2, with the subcarrier mapping module 2.2 in the frequency domain to M out of N inputs of a N-size IDFT module 2.3. Then, the N-size inverse DFT module 2.3 is applied to the resulting vector of the subcarrier mapping module 2.2, therefore generating a DFTsOFDM symbol which is transmitted via the transmit antenna 2.0.

Before adding the signals $S_{Incor}$ and $S_{Zero}$, it is advantageous to filter the signal $S_{Zero}$ to ensure that the samples in the signal $S_{Zero}$ of the symbols $X_{n_i+mL}$ with (i; m)∈〚0;Q-1〛×〚0;K-1〛, whose values have been set to 0, are also strictly equal to 0 in the frequency domain. Therefore, this enables to reduce the interference of the signal $S_{Zero}$ onto the signal $S_{Incor}$.

In the embodiment of FIG. 5 where the Q symbols, are incorporated at the output of the DFT module 2.1 (post-DFT), the signal obtained at the output of the adder, S, are identical (or at least equivalent) to the signal at the output of the DFT module 2.1 when the Q symbols are incorporated pre-DFT. In addition, the signal obtained at the output of the adder, S, is completely defined, except for the non-incorporated symbols, by the symbols in the block of symbols whose values are set to zero, and by the corresponding value of the samples of the symbols with (i; m)∈〚0;Q-1〛×〚0;K-1〛.

Therefore, all the features shown in relation with pre-DFT incorporation (FIG. 4) can be applied to post-DFT incorporation.

Therefore, the incorporation of each group of $Q_p$ symbols can be performed post-DFT as described in FIG. 5.

As in the embodiment of FIG. 4, the incorporator module 5.1 may be configured in a static way by previously configuring the positions $n_i$ with i∈〚0;Q-1〛. Several configurations may also be previously programmed, for example one configuration for each number Q, or a limited number of configurations for each number Q. Configuration can be done in an implicit manner (for example based on other parameters known by the transmitter), or in an explicit manner (for example based on instructions given by the base station via, e.g., a control channel), or a combination of the two.

Figure 6:
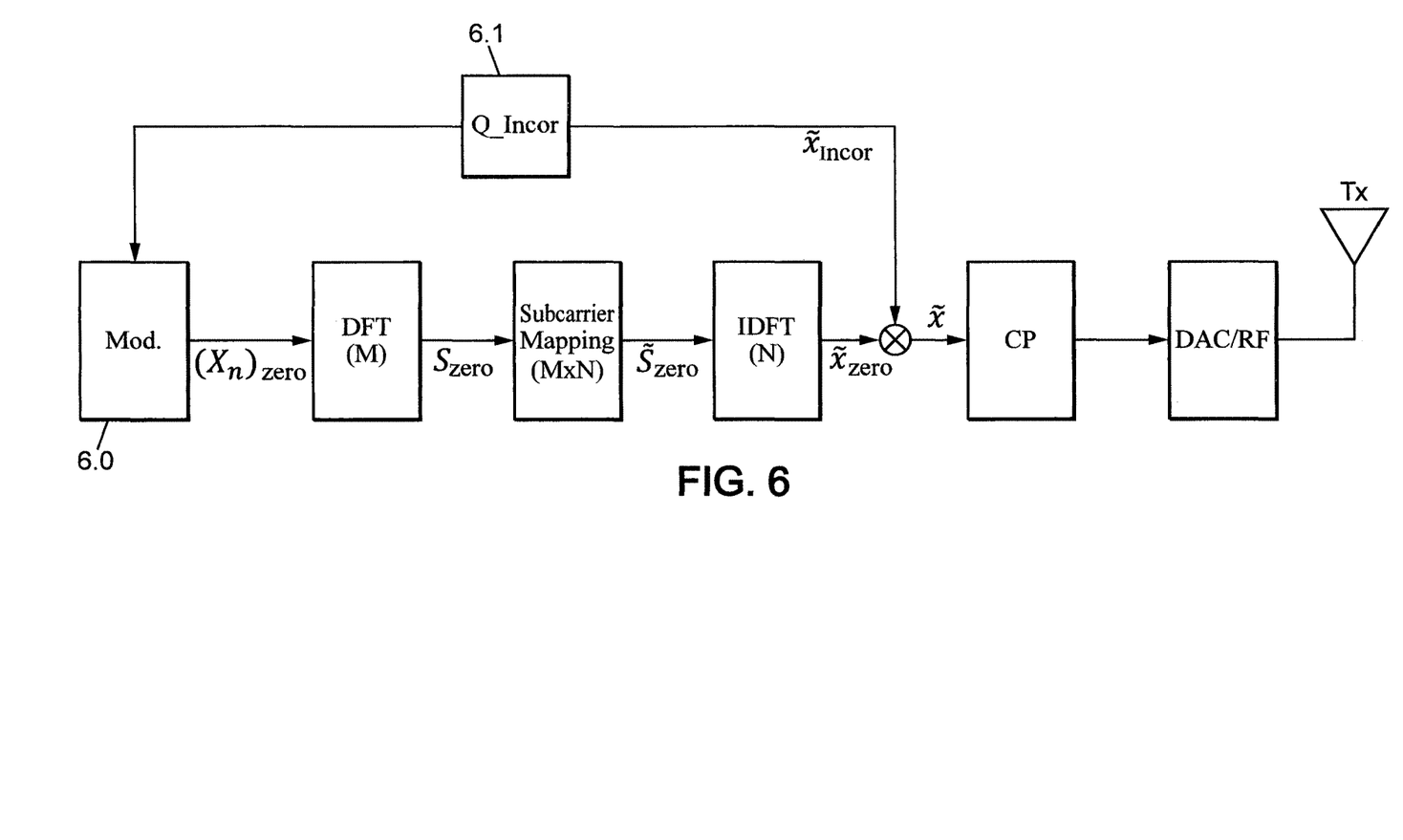
FIG. 6 schematizes a block diagram of post-IDFT incorporation of Q symbols according to the invention.

Referring to FIG. 6, there is shown a block diagram of post-IDFT incorporation of the Q symbols according to the invention. This embodiment can be applied as described hereafter to each of the K' groups of $Q_p$ symbols.

In this embodiment, the incorporation of the Q symbols is not done in the block of symbols (that is by setting directly the values of the symbols of the block of symbols as shown in FIG. 4) nor in the frequency domain (as shown in FIG. 6). The incorporation is done post-IDFT.

The scheme applied is identical to the one shown in FIG. 2, therefore, the different modules will be referenced with the same references.

The modulator module 6.0 is configured to set the values of the symbols $X_{n_i+mL}$ with (i; m)∈〚0;Q-1〛×〚0;K-1〛 to 0 before applying the DFT module 2.1. The modulator module 6.0 may be configured by the incorporator module 6.1, which can send the position configuration. The other symbols of the block of symbols may be set freely by the modulator module 6.0.

On this incomplete block of symbols $X_{Zero}$, the DFT module 2.1 is applied. At the output of the DFT module 2.1, M complex symbols are obtained in the frequency domain, which an $$S_{Zero} = (S_{l,Zero})_{l \in [\![0;M-1]\!]}.$$

These complex symbols are mapped, with the subcarrier mapping module 2.2 in the frequency domain to M out of N inputs of the N-size IDFT module 2.3, as described in FIG. 2.

The N-size inverse DFT module 2.3 is then applied to the resulting vector $\tilde{S}_{Zero}$ of the subcarrier mapping module 2.2. At the output of the IDFT module 2.3 a signal $\tilde{x}_{Zero} = (\tilde{x}_{0,Zero}, \ldots, \tilde{x}_{N-1,Zero})$ is obtained. The signal $\tilde{x}_{Zero}$ is a time-domain signal whose frequency-domain representation are the complex symbols $S_{l,Zero}$ for each PI occupied subcarrier with l=0 to M−1.

These M complex symbols form the subsequent signal at the output of the IDFT module 2.3.

The incorporator module 5.1 adds to the subsequent signal $\tilde{x}_{Zero}$ at the output of the IDFT module 2.3 the signal $\tilde{x}_{Incor}$. The signal $\tilde{x}_{Incor}$ is pre-computed samples of the symbols $X_{n_i+mL}$ with $(i; m) \in [\![0;Q-1]\!] \times [\![0;K-1]\!]$. That is, rather than setting the values of the symbols $X_{n_i+mL}$ with $(i; m) \in [\![0;Q-1]\!] \times [\![0;K-1]\!]$ in the block of symbols, the samples of the Q symbols are computed to obtain samples identical or at least equivalent to those that would have been obtain, at the output of the IDFT module 2.3 if the values of these symbols where set pre-DFT (directly in the block of symbols) as previously described. For example, $S_{Incor}$ can be obtained by applying a DFTsOFDM scheme (DFT module 2.1, Subcarrier mapping module 2.2 and IDFT module 2.3) to a block of symbols where the values of the symbols $X_{n_i+mL}$ with $(i; m) \in [\![0;Q-1]\!] \times [\![0;K-1]\!]$ are set respectively to the values $\omega^{k(n_i+mL)}A_i$ and the values of the other symbols are set to zero.

Then the DFTsOFDM symbol corresponding to the time-domains signal $\tilde{x}$ resulting from the sum of $\tilde{x}_{Incor}$ and $\tilde{x}_{Zero}$ is transmitted via the transmit antenna 2.0, as described in FIG. 2.

A cyclic prefix can be optionally appended after IDFT.

Before adding the signals $\tilde{x}_{Incor}$ and $\tilde{x}_{Zero}$, it is advantageous to filter the signal $\tilde{x}_{Zero}$ to ensure that the samples in the signal $\tilde{x}_{Zero}$ of the symbols $X_{n_i+mL}$ with $(i; m) \in [\![0;Q-1]\!] \times [\![0;K-1]\!]$, whose values have been set to 0, are also equal to 0. Therefore, this enables to reduce the interference of signal $\tilde{x}_{Zero}$ onto the signal $\tilde{x}_{Incor}$.

In the embodiment of FIG. 6 where the Q symbols are incorporated at the output of the IDFT module 2.3 (post-IDFT), the signal obtained at the output of the adder, $\tilde{x}$, are identical (or at least equivalent) to the signal at the output of the IDFT module 2.3 when the Q symbols are incorporated pre-DFT. In addition, the signal obtained at the output of the adder, $\tilde{x}$, is completely defined, except for the non-incorporated symbols, by the symbols in the block of symbols whose values are set to zero, and by the corresponding value of the samples of the symbols $X_{n_i+mL}$ with $(i; m) \in [\![0;Q-1]\!] \times [\![0;K-1]\!]$.

Therefore, all the features shown in relation with pre-DFT incorporation (FIG. 4) can be applied to post-IDFT incorporation.

Therefore, the incorporation of each group of $Q_p$ symbols can be performed post-IDFT as described in FIG. 6.

As in the embodiment of FIG. 4, the incorporator module 6.1 may be configured in a static way by previously configuring the positions $n_i$ with $i \in [\![0;Q-1]\!]$. Several configurations may also be previously programmed, for example one configuration for each number Q, or a limited number of configurations for each number Q. Configuration can be done in an implicit manner (for example based on other parameters known by the transmitter), or in an explicit manner (for example based on instructions given by the base station via, e.g., a control channel), or a combination of the two.

Figure 71:
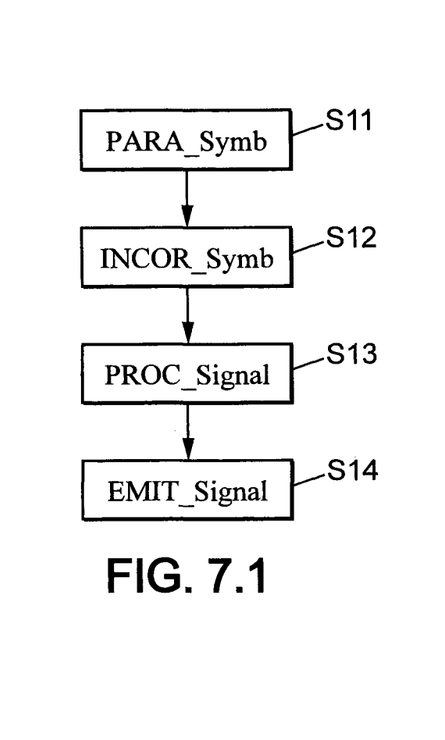

Referring to FIG. 7.1 there is shown a flowchart representing the steps of pre-DFT incorporating the symbols according to the invention.

At step S11 the incorporation module 4.1 is configured either in a static way or dynamically (that is that the incorporation module 4.1 is reconfigured depending for example on instructions given by the base station through a control channel), or by a combination of the two. In the case of a dynamic configuration the incorporation module 4.1 may choose another configuration upon those saved in the MEMO_trans 1.5. Indeed, several configurations may be pre-parametered in the incorporation module 4.1, those configurations can be ordered according to the number Q of symbols incorporated by the configuration. A configuration may be defined by the number Q, M and/or L, by the positions $n_i$ in the block of symbols X of the symbols $X_{n_i+mL}$ which convey the Q symbols $A_i$.

The incorporation module 4.1 may inform the modulator module 4.0 of the chosen configuration. Enabling the modulator module 4.0 to insert modulation symbols into the block of symbols in positions that do not conflict with the positions $n_i+mL$ with $(i; m) \in [\![0;Q-1]\!] \times [\![0;K-1]\!]$.

At step S12 the incorporation module 4.1, incorporates the Q symbols as previously described, by setting each value of the symbols $X_n$ which are at positions $n_i+mL$ with $(i; m) \in [\![0;Q-1]\!] \times [\![0;K-1]\!]$ to respectively the values $\omega^{k(n_i+mL)}A_i$.

At step S13 the signal is processed, by applying a DFTsOFDM scheme to the block of symbols as previously described.

At step S14 the signal is emitted by Tx 2.0.

Figure 72:
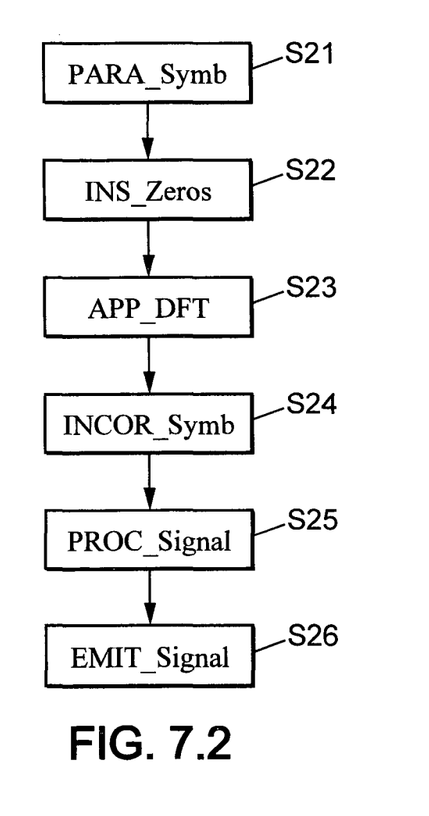

Referring to FIG. 7.2 there is shown a flowchart representing the steps of post-DFT incorporating the symbols according to the invention.

At step S21 the incorporation module 5.1 is configured as in FIG. 7.1 either in a static way or dynamically or by a combination of the two.

The incorporation module 5.1 may inform the modulator module 5.0 of the chosen configuration.

At step S22, based on the configuration of the incorporation module 5.1, the modulator module 5.0 sets the values of the symbols with $(i; m) \in [\![0;Q-1]\!] \times [\![0;K-1]\!]$ with $i \in [\![1;L]\!]$ to 0, as previously described in FIG. 5.

At step S23, the DFT module 2.1 is applied on the incomplete block of symbols $X_{Zero}$, as previously explained in FIG. 5.

At step S24 the incorporation module 5.1 adds to the signal $S_{Zero}$ the signal $S_{Incor}$ as described in FIG. 5.

At step S25, the remaining DFTsOFDM scheme (subcarrier mapping module 2.2, IDFT module 2.3) is applied on the signal S resulting from the sum of $S_{Zero}$ and $S_{Incor}$.

At step S26 the signal is emitted by Tx 2.0.

Figure 73:
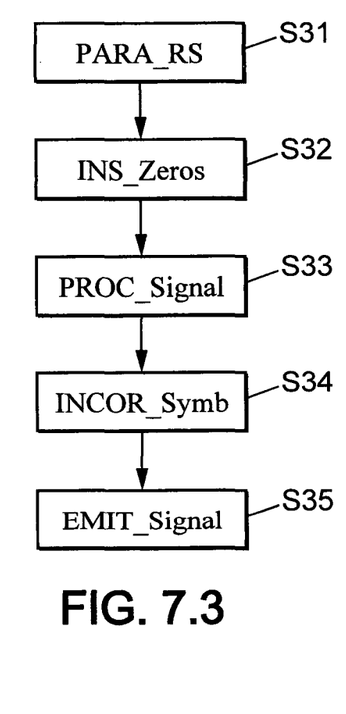

Referring to FIG. 7.3 there is shown a flowchart representing the steps of post-IDFT incorporating the symbols according to the invention.

At step S31 the incorporation module 6.1 is configured as in FIG. 7.1 either in a static way or dynamically or by a combination of the two.

The incorporation module 6.1 may inform the modulator module 6.0 of the chosen configuration.

At step S32, based on the configuration the modulator module 6.0 sets the values of the symbols $X_{n_i+mL}$ with $(i; m) \in [\![0;Q-1]\!] \times [\![0;K-1]\!]$ with $i \in [\![1;L]\!]$ to 0, as previously described in FIG. 6.

At step S33 the signal is processed, that is on the block of symbols $(X_n)_{Zero}$ is applied the DFTsOFDM scheme (DFT module 2.1, subcarrier mapping module 2.2, IDFT module 2.3).

At step S34 the incorporation module 6.1 adds to the output signals $\tilde{x}_{Zero}$ of the IDFT module 2.3, the signal $\tilde{x}_{Incor}$. The signal $\tilde{x}_{Incor}$ may be computed as previously mentioned in FIG. 6.

At step S35 the signal is emitted by Tx 2.0.

The invention claimed is:

1. A method for transmitting at least a group of Q symbols $(A_0; \ldots; A_{Q-1})$ in a radio signal to be transmitted over a wireless communication system, said radio signal being intended to be emitted by an emitter comprising at least one transmit antenna configured for transmitting on at least a number M, of different frequencies, M being equal to L·K with L and K strictly positive integer and Q being a strictly positive integer strictly smaller than L, said radio signal being provided by:

applying a M size DFT to a block of symbols $X = (X_0, \ldots X_{M-1})$, and obtaining for each $k^{th}$ frequency, with $k=0$ to $M-1$, a complex symbol $S_k$ in the frequency domain;

obtaining, at an output of an IDFT module corresponding to a transmit antenna a signal representing, in the frequency domain, complex symbols respectively function of $S_k$ for each $k^{th}$ frequency with $k=0$ to $M-1$;

emitting the radio signal corresponding to the signal;

said method comprising:

determining Q positions $n_i$ in the block of symbols, such as $\{n_i | i \in [\![0;Q-1]\!], 0 \leq n_i < L, \forall i, i' \in [\![0;Q-1]\!]^2, i<i' \Rightarrow n_i < n_{i'}\}$;

transmitting the Q symbols through the radio signal, such as for each i, samples of the symbol $a_i$ in the radio signal are equal to a result outputted by the IDFT module, of the application of the DFT to a block of M symbols with values of symbols $X_{ni+mL}$, in the positions $n_i+mL$, being respectively $e^{j2\pi k(n_i+mL)/M} A_i$, with k integer such as $0 \leq k < K$, with m integer such as $0 \leq m < K$, and j the imaginary number.

2. The method according to claim 1, wherein transmitting the Q symbols is done by setting the symbol $X_{n_i+mL}$ to the value $e^{j2\pi k(n_i+mL)/M} A_i$, for each i and m.

3. The method according to claim 1, said method further comprising setting the values of the symbols $X_{n_i+mL}$ to 0, with $(i; m) \in [\![0;Q-1]\!] \times [\![0;K-1]\!]$, before applying the DFT and obtaining a subsequent signal at the output of the IDFT module;

and wherein for each i and m, transmitting the Q symbols is done by adding the samples in said subsequent signal at the output of the IDFT module.

4. The method according to claim 1, said method further comprising setting the values of the symbols $X_{n_i+mL}$ to 0, with $(i; m) \in [\![0;Q-1]\!] \times [\![0;K-1]\!]$, before applying the DFT and obtaining a subsequent signal at the output of the DFT module;

and wherein for each i and m, transmitting the Q symbols is done by adding the samples in said subsequent signal at the output of the DFT module.

5. The method according to claim 1, wherein at least K' groups of $Q_p$ symbols $(A_0^p; \ldots; A_{Q_p-1}^p)$ are transmitted in the radio signal, with the $Q_p$ being strictly positive integers and $\Sigma Q_p \leq L$ and $K' \leq K$, said method comprising for each p:

determining a $k_p$ integer and $Q_p$ positions of $n_i^p$ in the block of symbols such as $$\left\{ n_i^p \middle| \begin{array}{l} i \in [\![0; Q_p-1]\!], 0 \leq n_i^p < L, \\ \forall (i; i') \in [\![0; Q_p-1]\!]^2, i < i' \Rightarrow n_i^p < n_{i'}^p, \\ \forall p' \in [\![1; K']\!], p' \neq p \Rightarrow \forall (i; i') \in [\![0; Q_p-1]\!]^2, n_i^{p'} \neq n_{i'}^p \end{array} \right\}; \text{ and}$$

$$0 \leq k_p < K, \forall p' \in [\![1; K']\!], p' \neq p \Rightarrow k_p \neq k_{p'}$$

transmitting the $Q_p$ symbols through the radio signal, such as for each i, samples of the symbol $A_i^p$ in the radio signal are equal to a result outputted by the IDFT module, of the application of the DFT to a block of M symbols with values of symbols $X_{n_i^p+mL}$, in the positions $n_i^p+mL$, are respectively $e^{j2\pi k_p(n_i^p+mL)/M} A_i^p$, with $m \in [\![0;K-1]\!]$.

6. The method according to claim 5, wherein if $\Sigma Q_p \neq L$, $\forall n \neq n_i^p$, with $(i; p) \in [\![0;Q-1]\!] \times [\![1;K']\!]$, the values of the symbols $X_n$ is set to 0 before applying the DFT.

7. The method according to claim 5, wherein $K' < K$.

8. The method according to claim 5, wherein $K' = K$.

9. The method according to claim 5, wherein for at least one p, $L = Q_p c$, with c positive integer, and $$\left\{ n_i^p \middle| \begin{array}{l} \forall i \in [\![0; Q_p-2]\!], n_{i+1}^p - n_i^p = c \\ n_0^p + L - n_{Q_p-1}^p = c \end{array} \right\}.$$

10. The method according to claim 5, wherein for at least one p, $\{n_i^p | n_{Q_p-1}^p - n_0^p = Q_p - 1\}$.

11. Computer program product comprising code instructions to perform the method according to claim 1, when said instructions are run by a processor.

12. A device for transmitting at least a group of Q symbols $(A_0; \ldots; A_{Q-1})$ in a radio signal to be transmitted over a wireless communication system, said radio signal being intended to be emitted by an emitter comprising at least one transmit antenna configured for transmitting on at least a number M, of different frequencies, M being equal to L·K with L and K strictly positive integer and Q being a strictly positive integer strictly smaller than L, said radio signal being provided by:

applying a M size DFT to a block of symbols $X = (X_0, \ldots X_{M-1})$, and obtaining for each $k^{th}$ frequency, with $k=0$ to $M-1$, a complex symbol $S_k$ in the frequency domain;

obtaining, at an output of an IDFT module corresponding to a transmit antenna a signal representing, in the frequency domain, complex symbols respectively function of $S_k$ for each $k^{th}$ frequency with k=0 to M−1;

emitting the radio signal corresponding to the signal;

said device being configured to:

determine Q positions $n_i$, in the block of symbols, such as $\{n_i | i \in [\![0;Q-1]\!], \ 0 \leq n_i < L, \ \forall i, \ i' \in [\![0;Q-1]\!]^2, \ i<i' \Rightarrow n_i < n_{i'}\}$;

transmitting the Q symbols through the radio signal, such as for each i, samples of the symbol $a_i$ in the radio signal are equal to a result outputted by the IDFT module, of the application of the DFT to a block of M symbols with values of symbols $X_{mi+mL}$, in the positions $n_i+mL$, being respectively $e^{j2\pi k(n_i+mL)/M} A_i$, with k integer such as 0≤k<K, with m integer such as 0≤m<K, and j the imaginary number.

* * * * *